(12) United States Patent
Mori

(10) Patent No.: US 11,336,310 B2
(45) Date of Patent: May 17, 2022

(54) RADIO FREQUENCY CIRCUIT AND COMMUNICATION DEVICE

(71) Applicant: MURATA MANUFACTURING CO., LTD., Kyoto (JP)

(72) Inventor: Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/099,826

(22) Filed: Nov. 17, 2020

(65) Prior Publication Data

US 2021/0159925 A1 May 27, 2021

(30) Foreign Application Priority Data

Nov. 21, 2019 (JP) .............................. JP2019-210068

(51) Int. Cl.
*H04L 5/12* (2006.01)
*H04L 23/02* (2006.01)
*H04B 1/00* (2006.01)
*H04B 1/04* (2006.01)

(52) U.S. Cl.
CPC ........... *H04B 1/006* (2013.01); *H04B 1/0067* (2013.01); *H04B 1/0483* (2013.01)

(58) Field of Classification Search
CPC ..... H04B 1/006; H04B 1/0067; H04B 1/0483
USPC ........................................................ 375/262
See application file for complete search history.

(56) References Cited

U.S. PATENT DOCUMENTS

| 10,257,119 | B2 | 4/2019 | Wloczysiak et al. | |
|---|---|---|---|---|
| 2009/0017772 | A1* | 1/2009 | Kemmochi | H04B 1/006 |
| | | | | 455/73 |
| 2014/0087668 | A1* | 3/2014 | Mow | H04W 24/08 |
| | | | | 455/67.14 |
| 2015/0036656 | A1* | 2/2015 | McCarthy | H04B 7/0689 |
| | | | | 370/331 |
| 2015/0380665 | A1* | 12/2015 | Kumar | H01G 9/2059 |
| | | | | 136/263 |

(Continued)

FOREIGN PATENT DOCUMENTS

JP 2009-027319 A 2/2009

OTHER PUBLICATIONS

Ericsson, Overview of Requirements for CA Between Licensed Band NR PCell and NR-U SCells, 3GPP TSG-RAN WG4 Meeting #90-Bis, Apr. 8-12, 2019, pp. 1-3, R4-1904176, Xi'an, P.R. of China.

*Primary Examiner* — Tanmay K Shah
(74) *Attorney, Agent, or Firm* — Pearne & Gordon LLP

(57) ABSTRACT

A radio frequency circuit includes: a first transfer circuit that transfers a signal of a first frequency band under 5 GHz; a second transfer circuit that transfers a signal of a second frequency band higher than or equal to 5 GHz; and a third transfer circuit that transfers a signal of a third frequency band higher than or equal to 5 GHz. One of the second transfer circuit and the third transfer circuit transfers a WLAN signal. The first transfer circuit includes a first filter. The second transfer circuit includes a second filter. The third transfer circuit includes a third filter. One of the first transfer circuit or the second transfer circuit further includes a band-stop filter having, as an attenuation band, at least a part of a frequency band in which the remaining one of the first transfer circuit or the second transfer circuit transfers a signal.

13 Claims, 7 Drawing Sheets

(56) References Cited

U.S. PATENT DOCUMENTS

| | | | |
|---|---|---|---|
| 2016/0380665 A1* | 12/2016 | Lee ..................... | H04B 1/401 |
| | | | 455/552.1 |
| 2018/0063031 A1* | 3/2018 | Wloczysiak .......... | H04W 40/02 |
| 2018/0278442 A1 | 9/2018 | Rogers et al. | |

* cited by examiner

RADIO FREQUENCY CIRCUIT AND COMMUNICATION DEVICE

CROSS REFERENCE TO RELATED APPLICATION

The present application is based on and claims priority of Japanese Patent Application No. 2019-210068 filed on Nov. 21, 2019. The entire disclosure of the above-identified application, including the specification, drawings, and claims, is incorporated herein by reference in its entirety.

TECHNICAL FIELD

The present disclosure relates to radio frequency circuits and communication devices.

BACKGROUND

Use and application of a frequency band that can be used without obtaining a radio station license (hereinafter referred to as an unlicensed band) in a mobile communication system used in, for example, mobile phones, is being considered. For example, in the 3rd Generation Partnership Project (3GPP), an unlicensed band higher than or equal to 5 GHz is being considered for use as a Long Term Evolution (LTE) carrier and as a New Radio (NR) carrier. U.S. Pat. No. 10,257,119 discloses a front end configuration that supports such LTE and NR carriers.

BRIEF SUMMARY

In the 5th generation mobile communication system (5G), simultaneous usage of an unlicensed band higher than or equal to 5 GHz with a communication band under 5 GHz and a wireless local area network (WLAN; 5 GHz band) communication band is being considered. However, it is recognized that, with the front end configuration disclosed in U.S. Pat. No. 10,257,119, when a transmission signal of a communication band under 5 GHz and a transmission signal of a communication band higher than or equal to 5 GHz are simultaneously transmitted, two transmission signals having different frequencies mix, generating intermodulation distortion. When the frequency of this intermodulation distortion is included in a communication band that is higher than or equal to 5 GHz, the quality of the radio frequency signal in a communication band of the unlicensed band or WLAN band that are higher or equal to 5 GHz degrades.

The present disclosure provides a radio frequency circuit and a communication device in which intermodulation distortion generation is inhibited when a signal of a WLAN communication band, a signal of a communication band in an unlicensed band of higher than or equal to 5 GHz, and a signal of a communication band under 5 GHz are simultaneously used.

To achieve this, a radio frequency circuit according to one aspect of the present disclosure includes: a first transfer circuit configured to transfer a signal of a first frequency band, the first frequency band including at least a part of a frequency region under 5 GHz; a second transfer circuit configured to transfer a signal of a second frequency band, the second frequency band including at least a part of a frequency region higher than or equal to 5 GHz; and a third transfer circuit configured to transfer a signal of a third frequency band, the third frequency band including at least a part of a frequency region higher than or equal to 5 GHz. One of the second transfer circuit or the third transfer circuit is configured to transfer a wireless local area network (WLAN) signal. The first transfer circuit includes a first filter having the first frequency band as a passband. The second transfer circuit includes a second filter having the second frequency band as a passband. The third transfer circuit includes a third filter having the third frequency band as a passband. One of the first transfer circuit or the second transfer circuit further includes a band-stop filter having, as an attenuation band, at least a part of a frequency band in which a remaining one of the first transfer circuit or the second transfer circuit transfers a signal.

A radio frequency circuit according to one aspect of the present disclosure includes: a first transfer circuit configured to transfer a signal of a first frequency band, the first frequency band including at least a part of a frequency region under 5 GHz; a second transfer circuit configured to transfer a signal of a second frequency band, the second frequency band including at least a part of a frequency region higher than or equal to 5 GHz; and a third transfer circuit configured to transfer a signal of a third frequency band, the third frequency band including at least a part of a frequency region higher than or equal to 5 GHz. One of the second transfer circuit or the third transfer circuit is configured to transfer a wireless local area network (WLAN) signal. The first transfer circuit includes a first transmission power amplifier configured to amplify a transmission signal of the first frequency band. The second transfer circuit includes a second transmission power amplifier configured to amplify a transmission signal of the second frequency band. One of the first transfer circuit or the second transfer circuit further includes a band-stop filter having, as an attenuation band, at least a part of a frequency band in which a remaining one of the first transfer circuit or the second transfer circuit transfers a signal.

The present disclosure is capable of providing a radio frequency circuit and a communication device in which intermodulation distortion generation can be inhibited when a signal of a WLAN communication band, a signal of a communication band in an unlicensed band of higher than or equal to 5 GHz, and a signal of a communication band under 5 GHz are simultaneously used.

BRIEF DESCRIPTION OF DRAWINGS

These and other advantages and features will become apparent from the following description thereof taken in conjunction with the accompanying Drawings, by way of non-limiting examples of embodiments disclosed herein.

DETAILED DESCRIPTION OF EMBODIMENT

Figure 1:
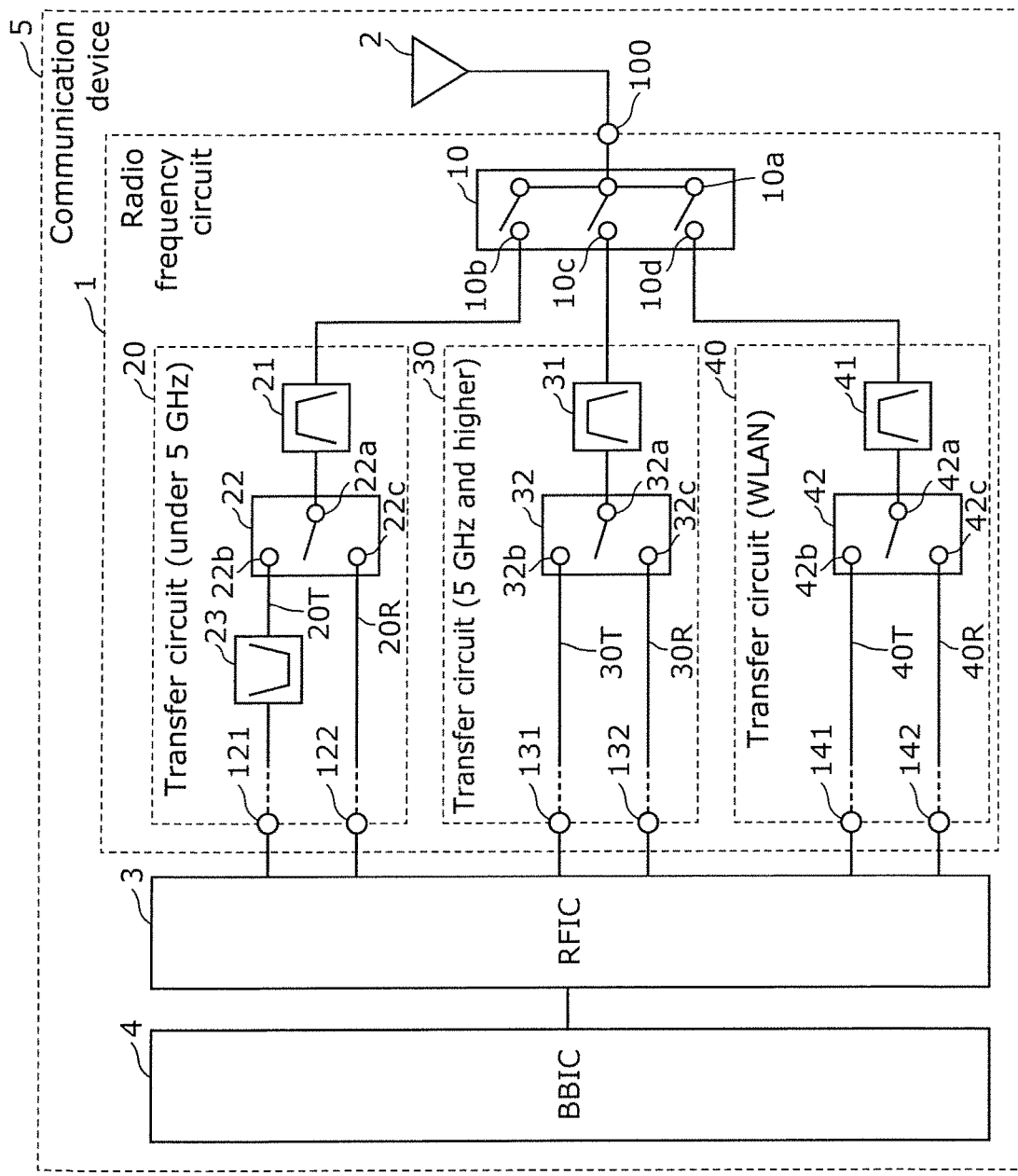
FIG. 1 illustrates a circuit configuration of a radio frequency circuit and a communication device according to an embodiment.

Hereinafter, an exemplary embodiment of the present disclosure and variations thereof will be described in detail with reference to the drawings. The subsequently described exemplary embodiment and variations each show a generic or a specific example. The numerical values, shapes, materials, elements, the arrangement and connection of the elements, and others indicated in the following exemplary embodiment and variations are mere examples, and therefore are not intended to limit the present disclosure. Among elements described in the following exemplary embodiment and variations, those not recited in any one of the independent claims are described as optional elements. In addition, the sizes of the elements and the ratios of the sizes illustrated in the drawings are not necessarily accurate.

In the following, a "path" means a transfer route that includes, for instance, a line along which a radio frequency signal propagates, an electrode directly connected to the line, and a terminal directly connected to the line or the electrode.

Embodiments

1. Circuit Configuration of Communication Device 5

FIG. 1 illustrates a circuit configuration of radio frequency circuit 1 and communication device 5 according to the embodiment. As illustrated in FIG. 1, communication device 5 includes radio frequency circuit 1, antenna 2, RF signal processing circuit (RFIC) 3, and baseband signal processing circuit (BBIC) 4.

Radio frequency circuit 1 transfers radio frequency signals between antenna 2 and RFIC 3. The circuit configuration of radio frequency circuit 1 will be described in greater detail later.

Antenna 2 is connected to antenna connection terminal 100 of radio frequency circuit 1, radiates radio frequency signals output from radio frequency circuit 1, receives reception signals from outside communication device 5, and outputs the received reception signals to radio frequency circuit 1.

RFIC 3 is one example of a signal processing circuit that processes radio frequency signals transmitted and received by antenna 2. More specifically, RFIC 3 performs signal processing using a down converter or the like on reception signals input via the reception path of radio frequency circuit 1, and outputs reception signals generated as a result of the signal processing to BBIC 4. RFIC 3 also performs signal processing using an up converter or the like on transmission signals input from BBIC 4, and outputs transmission signals generated as a result of the signal processing to the transmission path of radio frequency circuit 1.

BBIC 4 is a baseband signal processing circuit that performs signal processing using an intermediate frequency band lower than the frequency band of radio frequency signals transferred by radio frequency circuit 1. For example, signals processed by BBIC 4 are used as image signals for displaying images or voice signals for communication via a speaker.

RFIC 3 also functions as a controller that controls connectivity of switches 10, 22, 32, and 42 included in radio frequency circuit 1 based on the communication band used. More specifically, RFIC 3 conveys, to radio frequency circuit 1, control signals for switching the connectivity of switches 10, 22, 32, and 42 included in radio frequency circuit 1. RFIC 3 further functions as a controller that controls, for example, the gain of an amplifier included in radio frequency circuit 1. More specifically, RFIC 3 conveys control signals for adjusting, for example, the gain of the amplifier to radio frequency circuit 1. Note that the controller functionality of RFIC 3 may be provided external to RFIC 3. For example, the controller functionality may be provided in BBIC 4.

In communication device 5 according to the present embodiment, antenna 2 and BBIC 4 are optional components.

2. Circuit Configuration of Radio Frequency Circuit 1

Next, the configuration of radio frequency circuit 1 will be described in greater detail.

As illustrated in FIG. 1, radio frequency circuit 1 includes antenna connection terminal 100, switch 10, and transfer circuits 20, 30, and 40.

Antenna connection terminal 100 is one example of an input/output terminal that receives inputs of and outputs radio frequency signals. Antenna connection terminal 100 is connected to antenna 2.

Switch 10 is one example of a fifth switch that is disposed between antenna connection terminal 100 and transfer circuits 20 through 30. Switch 10 includes common terminal 10a and selection terminals 10b, 10c, and 10d, and connects and disconnects common terminal 10a and selection terminal 10b, connects and disconnects common terminal 10a and selection terminal 10c, and connects and disconnects common terminal 10a and selection terminal 10d. In other words, switch 10 connects and disconnects antenna connection terminal 100 and transfer circuit 20, connects and disconnects antenna connection terminal 100 and transfer circuit 30, and connects and disconnects antenna connection terminal 100 and transfer circuit 40. Note that switch 10 is a multi-connection switch circuit that can simultaneously achieve two or more of the following: connection between common terminal 10a and selection terminal 10b; connection between common terminal 10a and selection terminal 10c; and connection between common terminal 10a and selection terminal 10d.

Transfer circuit 20 is one example of a first transfer circuit that transfers a signal of a first frequency band including at least a part of a frequency region under 5 GHz. The first frequency band includes one or more communication bands belonging to the 4th generation mobile communication system (4G)-LTE or 5G-NR ultra-high band group (e.g., 3.3 GHz to 5 GHz).

Transfer circuit 30 is one example of a second transfer circuit that transfers a signal of a second frequency band including at least a part of a frequency region higher than or equal to 5 GHz. The second frequency band includes at least one communication band from among 4G-LTE Licensed-Assisted Access (LAA), NR-U (which is 5G-NR in an unlicensed band), and WLAN. NR-U is in the 5 GHz and higher bands of 3GPP 5G-NR, and corresponds to a U-NII communication band in the unlicensed bands stipulated by the Federal Communications Commission (FCC).

Transfer circuit 40 is one example of a third transfer circuit that transfers a signal of a third frequency band including at least a part of a frequency region higher than or equal to 5 GHz. The third frequency band includes at least one communication band from among 4G-LTE LAA, 5G-NR NR-U, and WLAN.

In the present embodiment, first frequency band is, for example, the 4.4 GHz to 5.0 GHz frequency band used in 4G-LTE or 5G-NR (n79 in the case of 5G-NR). The second frequency band is, for example, the 5.15 GHz to 5.925 GHz frequency band used in 4G-LTE or 5G-NR (B46 in the case of 4G-LTE). The third frequency band is, for example, a frequency band including at least a part of the 5.15 GHz to 5.85 GHz frequency band used in WLAN.

When the second frequency band is at least one of 4G-LTE LAA or 5G-NR NR-U, the third frequency band is a frequency band including at least a part of WLAN. On the other hand, when the third frequency band is at least one of 4G-LTE LAA or 5G-NR NR-U, the second frequency band is a frequency band including at least a part of WLAN. In other words, one of transfer circuit 30 and transfer circuit 40 transfers WLAN signals.

In the present embodiment, for example, the first frequency band may be any one of: the 3.3 GHz to 4.2 GHz frequency band used in 4G-LTE or 5G-NR (n77 in the case of 5G-NR); the 3.4 GHz to 3.6 GHz frequency band (B42 in the case of 4G-LTE); the 3.6 GHz to 3.8 GHz frequency band (B43 in the case of 4G-LTE); the 3.55 GHz to 3.7 GHz frequency band (n48 in the case of 5G-NR); or the 3.3 GHz to 3.8 GHz frequency band (n78 in the case of 5G-NR). In such cases, the second frequency band may be the 5.15 GHz to 5.925 GHz frequency band used in 4G-LTE or 5G-NR (B46 in the case of 4G-LTE), and the third frequency band may be a frequency band including at least a part of the 6.10 GHz to 7.125 GHz frequency band used in WLAN.

Next, the configurations of transfer circuits 20, 30, and 40 will be described in greater detail.

Transfer circuit 20 includes filter 21, switch 22, and band-stop filter 23.

Filter 21 is one example of a first filter having the first frequency band as a passband. Filter 21 is disposed between switch 10 and switch 22.

Band-stop filter 23 has at least a part of the second frequency band as an attenuation band, and is disposed on transmission path 20T that connects switch 22 and transmission input terminal 121. Band-stop filter 23 may be disposed between switch 10 and filter 21 rather than on transmission path 20T. On one hand, such a configuration is disadvantageous from the perspective that the first reception signal that transfers through transfer circuit 20 also passes through band-stop filter 23, which contributes to insertion loss of first reception signal, but on the other hand, since the second transmission signal from transfer circuit 30 can be preemptively inhibited from being introduced into filter 21, which has a non-linear component, it is advantageous from the perspective that it contributes to the inhibition of intermodulation distortion generation.

Switch 22 includes common terminal 22a and selection terminals 22b and 22c. Common terminal 22a is connected to filter 21, selection terminal 22b is connected to transmission path 20T on which band-stop filter 23 is disposed, and selection terminal 22c is connected to reception path 20R that connects reception output terminal 122 and selection terminal 22c. With this connection configuration, switch 22 switches the connection of filter 21 between transmission path 20T and reception path 20R.

With this configuration, filter 21 is a time division duplex filter that is mutually exclusively connected to one of transmission path 20T or reception path 20R (i.e., is selectively connected to transmission path 20T and reception path 20R). In other words, the first frequency band is switched between a transmission band and a reception band by time division (i.e., by using a time division duplex method).

Note that transfer circuit 20 needs not to operate using a time division duplex method, and may operate using a frequency division duplex method instead. In such cases, filter 21 is a duplexer including a transmission filter and a reception filter, and switch 22 is omitted.

Transfer circuit 30 includes filter 31 and switch 32.

Filter 31 is one example of a second filter having the second frequency band as a passband. Filter 31 is disposed between switch 10 and switch 32.

Switch 32 includes common terminal 32a and selection terminals 32b and 32c. Common terminal 32a is connected to filter 31, selection terminal 32b is connected to transmission path 30T that connects transmission input terminal 131 and selection terminal 32b, and selection terminal 32c is connected to reception path 30R that connects reception output terminal 132 and selection terminal 32c. With this connection configuration, switch 32 switches the connection of filter 31 between transmission path 30T and reception path 30R.

With this configuration, filter 31 is a time division duplex filter that is mutually exclusively connected to one of transmission path 30T or reception path 30R (i.e., is selectively connected to transmission path 30T and reception path 30R). In other words, the second frequency band is switched between a transmission band and a reception band by time division (i.e., by using a time division duplex method).

Note that transfer circuit 30 needs not to operate using a time division duplex method, and may operate using a frequency division duplex method instead. In such cases, filter 31 is a duplexer including a transmission filter and a reception filter, and switch 32 is omitted.

Band-stop filter 23 disposed in transfer circuit 20 in this example may be disposed in transfer circuit 30. In such cases, the band-stop filter disposed in transfer circuit 30 has at least a part of the first frequency band as an attenuation band, and is disposed on transmission path 30T that connects switch 32 and transmission input terminal 131. Moreover, the band-stop filter may be disposed in each of transfer circuit 20 and transfer circuit 30.

Transfer circuit 40 includes filter 41 and switch 42.

Filter 41 is one example of a third filter having the third frequency band as a passband. Filter 41 is disposed between switch 10 and switch 42.

Switch 42 includes common terminal 42a and selection terminals 42b and 42c. Common terminal 42a is connected to filter 41, selection terminal 42b is connected to transmission path 40T that connects transmission input terminal 141 and selection terminal 42b, and selection terminal 42c is connected to reception path 40R that connects reception output terminal 142 and selection terminal 42c. With this connection configuration, switch 42 switches the connection of filter 41 between transmission path 40T and reception path 40R.

With this configuration, filter 41 is a time division duplex filter that is mutually exclusively connected to one of transmission path 40T or reception path 40R (i.e., is selectively connected to transmission path 40T and reception path 40R). In other words, the third frequency band is switched between a transmission band and a reception band by time division (i.e., by using a time division duplex method).

Note that transfer circuit 40 needs not to operate using a time division duplex method, and may operate using a frequency division duplex method instead. In such cases, filter 41 is a duplexer including a transmission filter and a reception filter, and switch 42 is omitted.

Each of transfer circuits 20, 30, and 40 may further include a transmission power amplifier and a reception low noise amplifier, for example.

Switches 10, 22, 32, and 42 are field effect transistor (FET) switches comprising GaAs or complementary metal oxide semiconductor (CMOS), or are diode switches.

Note that in radio frequency circuit 1 according to the present embodiment, each of filters 21, 31, and 41 may be directly connected to antenna connection terminal 100 without providing switch 10. This configuration makes it possible to compensate for the increase in transfer loss by band-stop filter 23 by removing switch 10.

However, by disposing switch 10 as illustrated in FIG. 1, when at least any one of transfer circuits 20, 30, and 40 is not used, by placing the selection terminal connected to the unused transfer circuit and common terminal 10a in a non-conducting state, isolation between transfer circuits can be improved.

3. Simultaneous Transfer by Radio Frequency Circuit 1

Figure 2A:
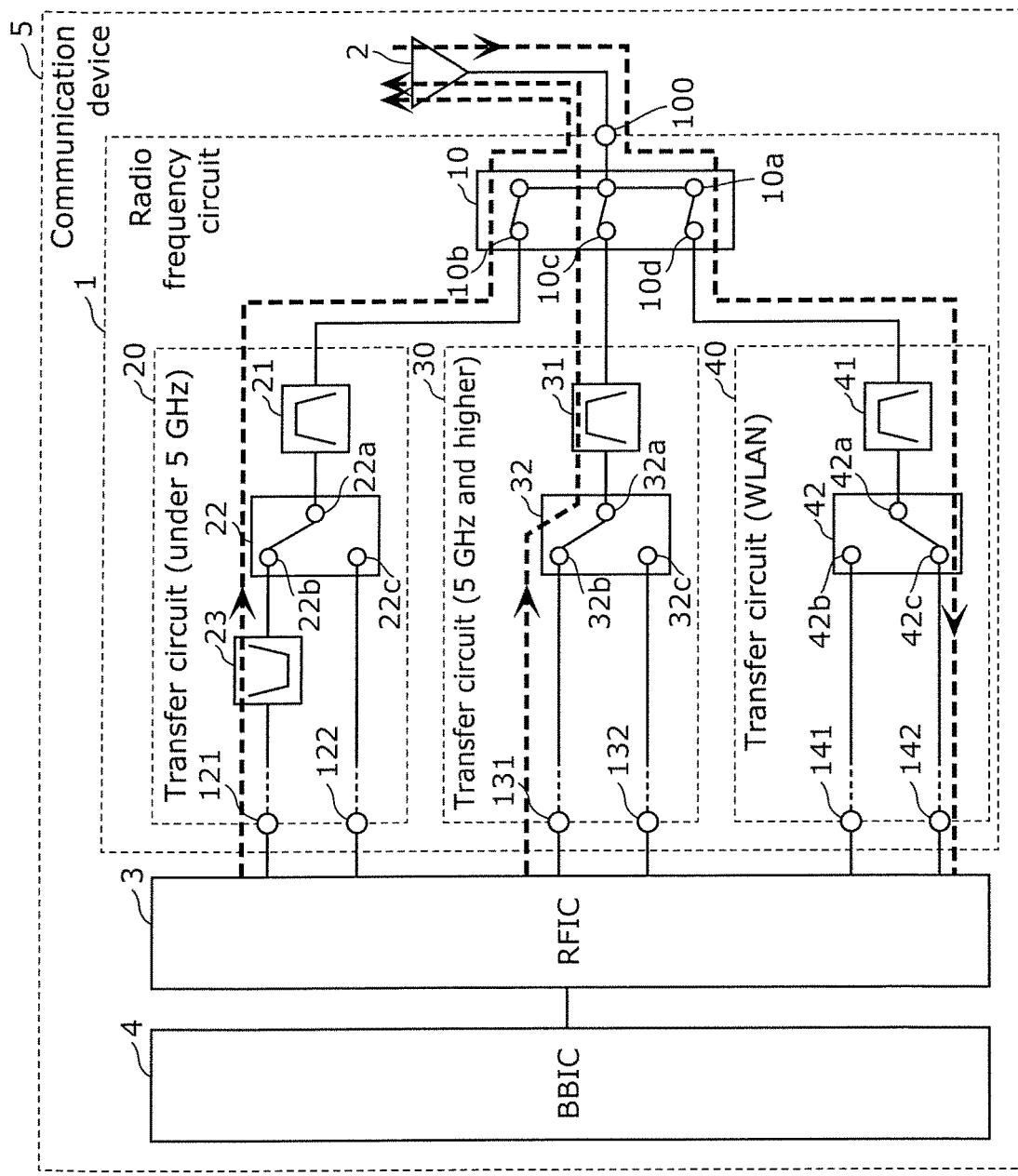
FIG. 2A is a circuit diagram illustrating one example of the flow of signals when three transfer circuits according to the embodiment are used simultaneously.

FIG. 2A is a circuit diagram illustrating one example of the flow of signals when transfer circuits 20 through 40 according to the present embodiment are used simultaneously. More specifically, FIG. 2A illustrates the flow of signals in radio frequency circuit 1 and communication device 5 according to the present embodiment when a first transmission signal of the first frequency band is transmitted from transfer circuit 20, a second transmission signal of the second frequency band is transmitted from transfer circuit 30, and a third reception signal of the third frequency band is received by transfer circuit 40 simultaneously.

In switch 10, common terminal 10a and selection terminal 10b are connected, common terminal 10a and selection terminal 10c are connected, and common terminal 10a and selection terminal 10d are connected.

In transfer circuit 20, common terminal 22a and selection terminal 22b of switch 22 are connected, and the first transmission signal of the first frequency band is output from antenna 2 via transmission input terminal 121, band-stop filter 23, switch 22, filter 21, and switch 10.

In transfer circuit 30, common terminal 32a and selection terminal 32b of switch 32 are connected, and the second transmission signal of the second frequency band is output from antenna 2 via transmission input terminal 131, switch 32, filter 31, and switch 10.

In transfer circuit 40, common terminal 42a and selection terminal 42c of switch 42 are connected, and the third reception signal of the third frequency band is output to RFIC 3 via antenna 2, switch 10, filter 41, switch 42, and reception output terminal 142.

In other words, with the circuit illustrated in FIG. 2A, a transmission signal of the first frequency band, a transmission signal of the second frequency band, and a reception signal of the third frequency band are transferred simultaneously.

In radio frequency circuit 1, which simultaneously transmits two signals of different frequencies, namely the first transmission signal and the second transmission signal, there is a concern that one of the first transmission signal and the second transmission signal may leak into the one of transfer circuit 20 and transfer circuit 30 that does not output the one transmission signal, whereby the first transmission signal and the second transmission signal may mix in the one transfer circuit and generate intermodulation distortion (hereinafter also denoted as IMD). In particular, a frequency of third order intermodulation distortion defined by the first transmission signal that is under 5 GHz and the second transmission signal that is 5 GHz or above may conceivably be included in the third frequency band in which transfer circuit 40 operates. In such cases, when the third reception signal in transfer circuit 40 is transferred at the same time as the first transmission signal and the second transmission signal, there is a concern that the reception sensitivity of the third reception signal on reception path 40R of transfer circuit 40 may degrade. Additionally, when components of the above-described intermodulation distortion are superimposed on the first transmission signal output from transfer circuit 20 and the second transmission signal output from transfer circuit 30, there is a concern that the signal quality of the first transmission signal and the second transmission signal output from antenna 2 may decrease.

Figure 2B:
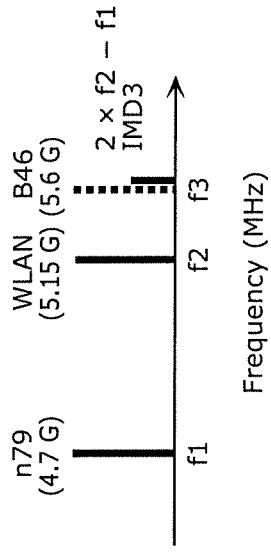
FIGS. 2BA and 2BB schematically illustrate the generation of intermodulation distortions in 5G-NR n79, 4G-LTE B46, and WLAN.
Figure 2B:
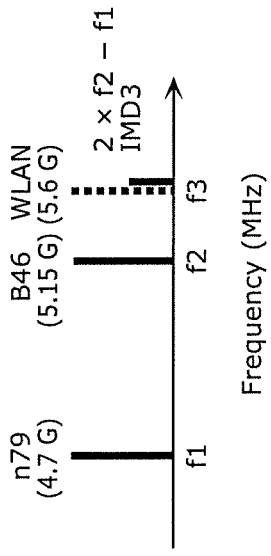

FIGS. 2BA and 2BB schematically illustrate the generation of third order intermodulation distortions in 5G-NR n79, 4G-LTE B46, and WLAN.

FIG. 2BA illustrates third order intermodulation distortion (IMD3) defined when 5G-NR n79 is implemented as the first frequency band, 4G-LTE B46 is implemented as the second frequency band, and WLAN is implemented as the third frequency band. For example, when the first transmission signal has a center frequency of 4.7 GHz (f1) of n79 and the second transmission signal has a center frequency of 5.15 GHz (f2) of B46, the third order intermodulation distortion (IMD3) defined by 2×f2−f1 is 5.6 GHz, which is included in the WLAN third frequency band. Accordingly, there is a concern that the reception sensitivity of WLAN reception signals in reception path 40R of transfer circuit 40 may degrade.

FIG. 2BB illustrate third order intermodulation distortion (IMD3) defined when 5G-NR n79 is implemented as the first frequency band, WLAN is implemented as the second frequency band, and 4G-LTE B46 is implemented as the third frequency band. For example, when the first transmission signal has a center frequency of 4.7 GHz (f1) of n79 and the second transmission signal has a center frequency of 5.15 GHz (f2) of WLAN, the third order intermodulation distortion (IMD3) defined by 2×f2−f1 is 5.6 GHz, which is included in the B46 third frequency band. Accordingly, there is a concern that the reception sensitivity of B46 (LAA) reception signals in reception path 40R of transfer circuit 40 may degrade.

Conventionally, since the communication systems and frequency regions differ between the WLAN transfer circuit including a frequency region of 5 GHz and above and the 4G-LTE and 5G-NR communication band transfer circuit, the transfer circuits are assumed to be connected to different antennas. However, in recent years, like radio frequency circuit 1 according to the present embodiment, simultaneous use of transfer circuits 30 and 40 that transfer signals in a frequency region of 5 GHz and above with transfer circuit 20 that transmits signals in a frequency region under and in the vicinity of 5 GHz is being considered. In such cases, when realizing a communication device that is miniaturized and transmits signals of 5 GHz and above at low loss, it is preferable to reduce the number of antennas used as much as possible. However, when a common antenna is used for a plurality of transfer circuits in such cases, it is difficult to ensure signal isolation between the plurality of transfer circuits. In regard to the transferring of signals of 5 GHz and above in particular, in addition to the introduction of unwanted signals via an antenna, the introduction of unwanted signals via air propagation and the introduction of unwanted signals via, for example, electromagnetic coupling of circuit elements included in the transfer circuits increase, even when individual antennas are provided to the transfer circuits.

In view of this, with radio frequency circuit 1 according to the present embodiment, in order to inhibit the degradation of the reception sensitivity of the third reception signal caused by third order intermodulation distortion of the first transmission signal and the second transmission signal, and inhibit a reduction in quality of transmission signals, transfer circuit 20 is provided with band-stop filter 23. Band-stop filter 23 has at least a part of the second frequency band as an attenuation band, and is disposed on transmission path 20T. Accordingly, even if the second transmission signal of the second frequency band that is output from transfer circuit 30 toward antenna 2 is introduced into transfer circuit 20 via switch 10, the introduced second transmission signal is attenuated by band-stop filter 23. Likewise, even if the second transmission signal is introduced into transfer circuit 20 as a result of electromagnetic coupling of filters 21 and 31 and switches 22 and 32, for example, the introduced second transmission signal is attenuated by band-stop filter 23.

This inhibits intermodulation distortion defined by the first transmission signal and the second transmission signal in transfer circuit 20. Accordingly, when the third reception signal in transfer circuit 40 is transferred at the same time as the first transmission signal and the second transmission signal, it is possible to inhibit the degradation of the reception sensitivity of transfer circuit 40 caused by the above-described third order intermodulation distortion. It is also possible to inhibit a reduction in signal quality of the first transmission signal and the second transmission signal caused by the above-described third order intermodulation distortion.

Stated differently, it is possible to provide radio frequency circuit 1 and communication device 5 in which intermodulation distortion generation is inhibited when a signal of a WLAN communication band, a signal of a communication band in an unlicensed band higher than or equal to 5 GHz, and a signal of a communication band under 5 GHz are simultaneously used.

With radio frequency circuit 1 according to the present embodiment, providing band-stop filter 23 makes it possible to inhibit the sidelobe of a modulated signal of the first frequency band (for example, n79 in the case of 5G-NR) that transfers through transfer circuit 20 from expanding into the second frequency band (for example, WLAN).

Although band-stop filter 23 is exemplified as having at least a part of the second frequency band as an attenuation band, band-stop filter 23 may further have at least a part of the first frequency band as an attenuation band. For example, when the first frequency band is 5G-NR n79 (4.4 GHz to 5.0 GHz), since 5G-NR n79 (4.4 GHz to 5.0 GHz) is used in the frequency range of 4.4 GHz to 4.9 GHz in Japan, band-stop filter 23 may further have the frequency range of 4.9 GHz to 5.0 GHz as an attenuation band.

Although communication device 5 according to the present embodiment is exemplified as having a configuration in which transfer circuits 20, 30, and 40 are connected to a single antenna 2, transfer circuit 20 and transfer circuit 30 may be connected to different antennas. Even when transfer circuits 20 and 30 are connected to different antennas, radio frequency circuit 1 according to the present embodiment is capable of inhibiting a decrease in signal quality of the first transmission signal and the second transmission signal caused by the above-described third order intermodulation distortion.

When transfer circuits 20 and 30 are connected to different antennas, band-stop filter 23 may also include the bandpass function of filter 21. In such cases, filter 21 may be omitted. In contrast, when transfer circuits 20 and 30 are connected to the same antenna 2, since the intensity of spurious wave components of the above-described third order intermodulation distortion that may be introduced into transfer circuit 20 is high, band-stop filter 23 and filter 21 are preferably individually provided.

4. Circuit Configuration of Radio Frequency Circuit 1A According to Variation 1

Figure 3:
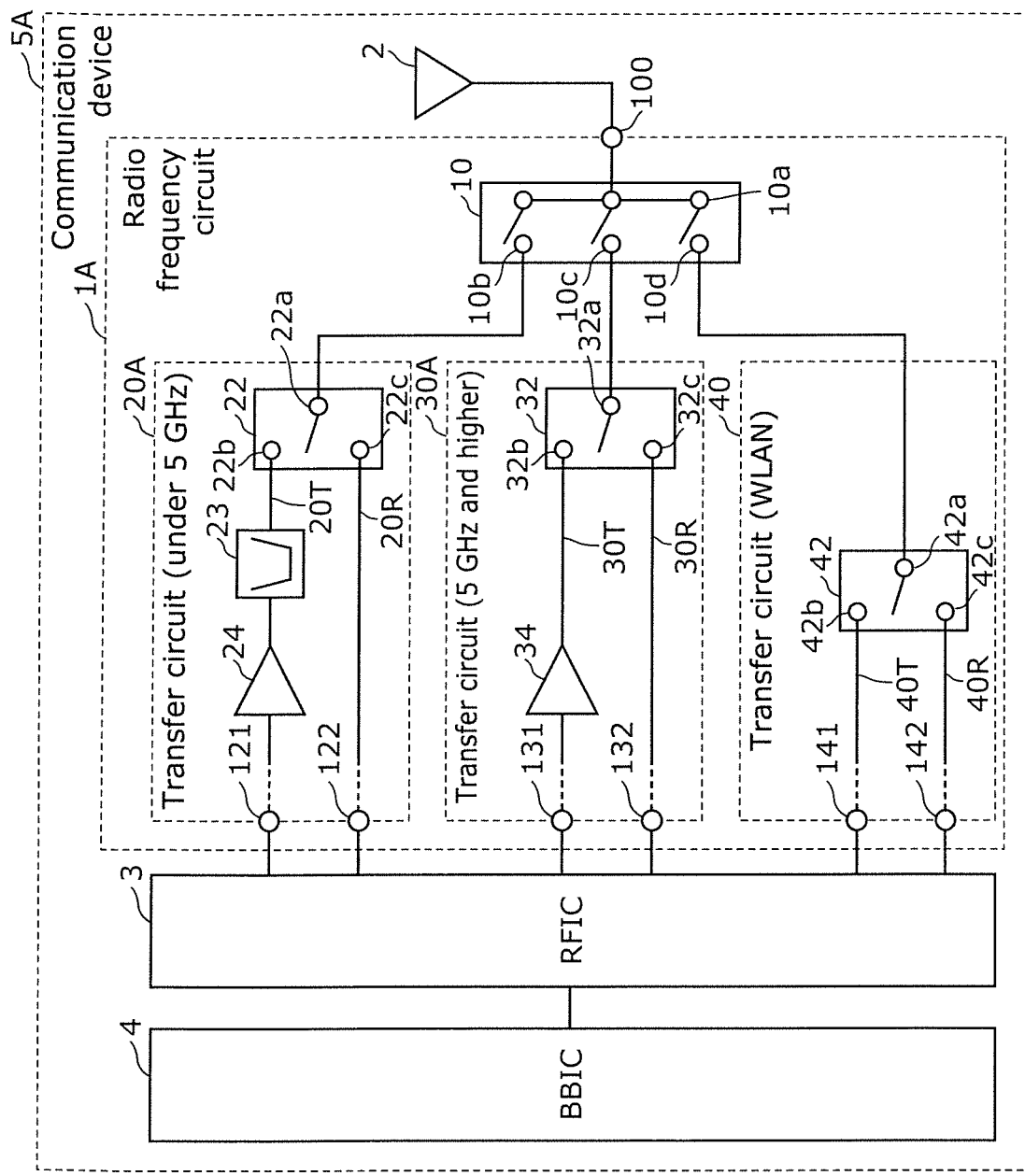
FIG. 3 illustrates a circuit configuration of a radio frequency circuit and a communication device according to Variation 1 of the embodiment.

FIG. 3 illustrates a circuit configuration of radio frequency circuit 1A and communication device 5A according to Variation 1 of the embodiment. As illustrated in FIG. 3, communication device 5A includes radio frequency circuit 1A, antenna 2, RFIC 3, and BBIC 4. Communication device 5A according to the present variation differs from communication device 5 according to the embodiment in regard to the configuration of radio frequency circuit 1A only. Hereinafter, radio frequency circuit 1A according to the present variation will be described.

Radio frequency circuit 1A includes antenna connection terminal 100, switch 10, and transfer circuits 20A, 30A, and 40. Radio frequency circuit 1A according to the present variation differs from radio frequency circuit 1 according to the embodiment in regard to configurations of transfer circuits 20A and 30A only. Hereinafter, description of common points between radio frequency circuit 1A according to the present variation and radio frequency circuit 1 according to the embodiment will be omitted; the description will focus on the points of difference in configuration.

Transfer circuit 20A is one example of the first transfer circuit that transfers a signal of a first frequency band including at least a part of a frequency region under 5 GHz. The first frequency band includes one or more communication bands belonging to the 4G-LTE or 5G-NR ultra-high band group.

Transfer circuit 20A includes switch 22, band-stop filter 23, and transmission power amplifier 24.

Band-stop filter 23 has at least a part of the second frequency band as an attenuation band, and is disposed on the part of transmission path 20T that connects switch 22 and the output terminal of transmission power amplifier 24. Band-stop filter 23 may be disposed between switch 10 and switch 22 rather than on transmission path 20T. On one hand, such a configuration is disadvantageous from the perspective that the first reception signal that transfers through transfer circuit 20A also passes through band-stop filter 23, which contributes to insertion loss of first reception signal, but on the other hand, since the second transmission signal from transfer circuit 30A can be preemptively inhibited from being input into switch 22, which has a non-linear component, it is advantageous from the perspective that it contributes to the inhibition of intermodulation distortion generation.

Switch 22 includes common terminal 22a and selection terminals 22b and 22c. Common terminal 22a is connected to selection terminal 10b of switch 10, selection terminal 22b is connected to transmission path 20T on which band-stop filter 23 is disposed, and selection terminal 22c is connected to reception path 20R. With this connection configuration, switch 22 switches the connection of switch 10 between transmission path 20T and reception path 20R.

Transmission power amplifier 24 is one example of a first transmission power amplifier that amplifies a transmission signal of the first frequency band, and is disposed between transmission input terminal 121 and band-stop filter 23.

Transfer circuit 30A is one example of the second transfer circuit that transfers a signal of the second frequency band including at least a part of a frequency region higher than or equal to 5 GHz. The second frequency band includes at least one communication band from among 4G-LTE LAA, 5G-NR NR-U, and WLAN.

Transfer circuit 30A includes switch 32 and transmission power amplifier 34.

Switch 32 includes common terminal 32a and selection terminals 32b and 32c. Common terminal 32a is connected to selection terminal 10c of switch 10, selection terminal 32b is connected to transmission path 30T, and selection terminal 32c is connected to reception path 30R. With this connection configuration, switch 32 switches the connection of switch 10 between transmission path 30T and reception path 30R.

Transmission power amplifier 34 is one example of a second transmission power amplifier that amplifies a transmission signal of the second frequency band, and is disposed between transmission input terminal 131 and switch 32.

For example, transmission power amplifiers 24 and 34 are configured of bipolar amplifier transistors. The amplifier transistors included in transmission power amplifiers 24 and 34 are not limited to bipolar amplifier transistors, and may be metal-oxide-semiconductor field-effect-transistors (MOSFETs).

Band-stop filter 23 disposed in transfer circuit 20A in this example may be disposed in transfer circuit 30A. In such cases, the band-stop filter disposed in transfer circuit 30A has at least a part of the first frequency band as an attenuation band, and is disposed between switch 32 and the output terminal of transmission power amplifier 34. Moreover, the band-stop filter may be disposed in each of transfer circuit 20A and transfer circuit 30A.

Transfer circuit 40 is one example of the third transfer circuit that transfers a signal of the third frequency band including at least a part of a frequency region higher than or equal to 5 GHz. The third frequency band includes at least one communication band from among 4G-LTE LAA, 5G-NR NR-U, and WLAN. In the present variation, the third frequency band is, for example, a frequency band including at least a part of WLAN.

When the second frequency band is at least one of 4G-LTE LAA and 5G-NR NR-U, the third frequency band is a frequency band including at least a part of WLAN. On the other hand, when the third frequency band is at least one of 4G-LTE LAA and 5G-NR NR-U, the second frequency band is a frequency band including at least a part of WLAN. In other words, one of transfer circuit 30A and transfer circuit 40A transfers WLAN signals.

Transfer circuit 20A may include a filter having the first frequency band as a passband. Transfer circuit 30A may include a filter having the second frequency band as a passband.

With radio frequency circuit 1A according to the present variation, in order to inhibit the degradation of the reception sensitivity of transfer circuit 40 caused by third order intermodulation distortion of the first transmission signal and the second transmission signal, and inhibit a reduction in quality of transmission signals, transfer circuit 20A is provided with band-stop filter 23. Band-stop filter 23 has at least a part of the second frequency band as an attenuation band, and is disposed on transmission path 20T. Accordingly, even if the second transmission signal of the second frequency band that is output from transfer circuit 30A toward antenna 2 is introduced into transfer circuit 20A via switch 10, the introduced second transmission signal is attenuated by band-stop filter 23. Likewise, even if the second transmission signal is introduced into transfer circuit 20A as a result of electromagnetic coupling of switches 22 and 32 and the like, the introduced second transmission signal is attenuated by band-stop filter 23.

This makes it possible to inhibit the above-described third order intermodulation distortion that generates in transmission power amplifier 24. Accordingly, when the third reception signal in transfer circuit 40 is transferred at the same time as the first transmission signal and the second transmission signal, it is possible to inhibit the degradation of the reception sensitivity of transfer circuit 40 caused by the above-described third order intermodulation distortion. It is also possible to inhibit a reduction in signal quality of the first transmission signal and the second transmission signal caused by the above-described third order intermodulation distortion.

5. Circuit Configuration of Radio Frequency Circuit 1B According to Variation 2

Figure 4A:
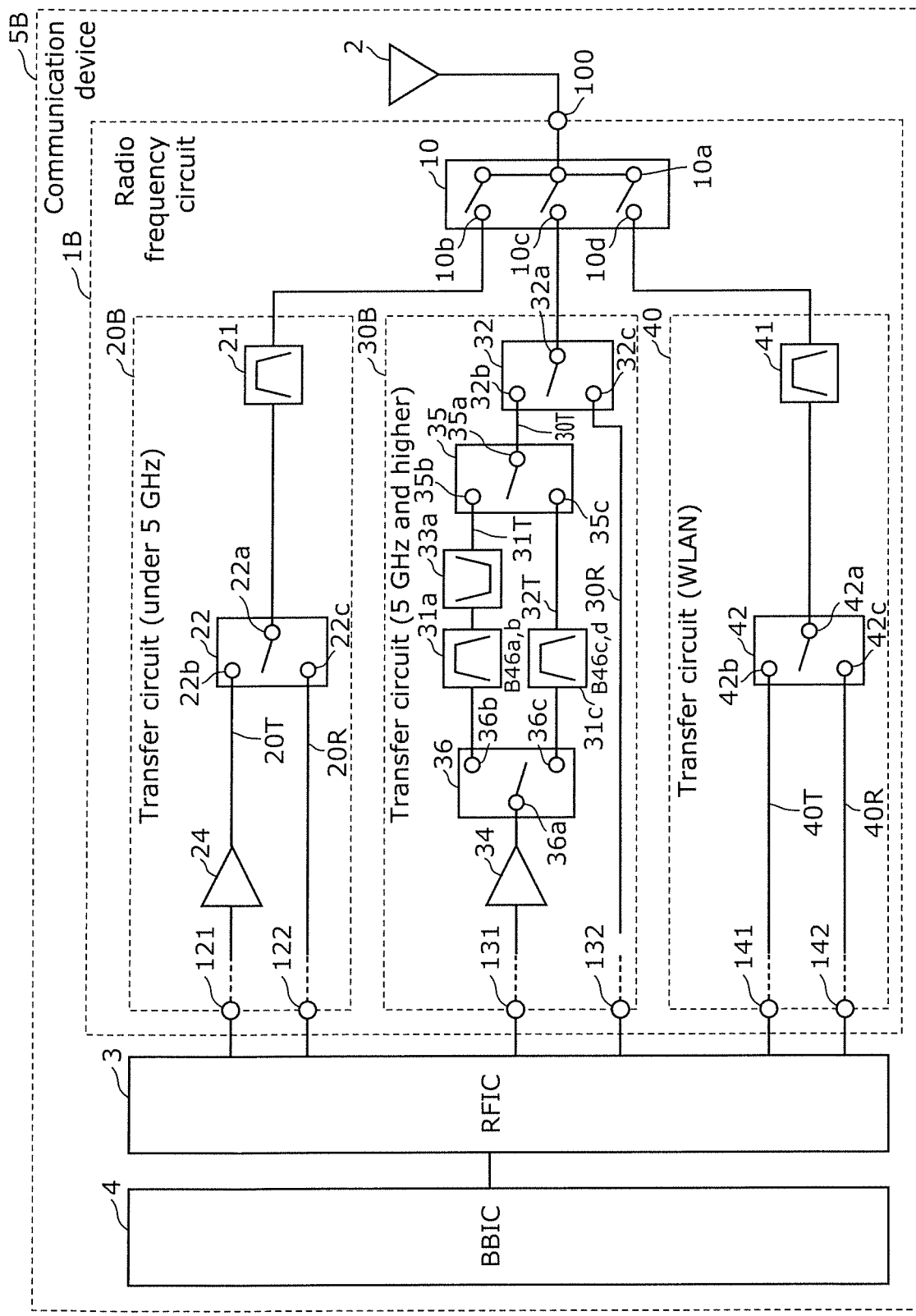
FIG. 4A illustrates a circuit configuration of a radio frequency circuit and a communication device according to Variation 2 of the embodiment.

FIG. 4A illustrates a circuit configuration of radio frequency circuit 1B and communication device 5B according to Variation 2 of the embodiment. As illustrated in FIG. 4A, communication device 5B includes radio frequency circuit 1B, antenna 2, RFIC 3, and BBIC 4. Communication device 5B according to the present variation differs from communication device 5 according to the embodiment in regard to the configuration of radio frequency circuit 1B only. Hereinafter, radio frequency circuit 1B according to the present variation will be described.

Radio frequency circuit 1B includes antenna connection terminal 100, switch 10, and transfer circuits 20B, 30B, and 40. Radio frequency circuit 1B according to the present variation differs from radio frequency circuit 1 according to the embodiment in regard to configurations of transfer circuits 20B and 30B only. Hereinafter, the descriptions of common points between radio frequency circuit 1B according to the present variation and radio frequency circuit 1 according to the embodiment will be omitted; the description will focus on the points of the differences in configuration.

Figure 4B:
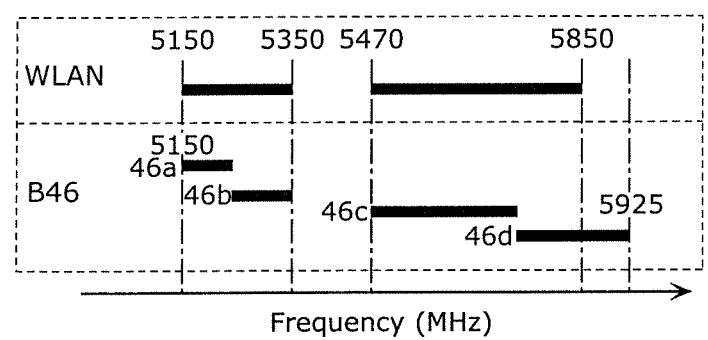
FIG. 4B illustrates frequency allocation in WLAN and B46.

FIG. 4B illustrates frequency allocation in WLAN and B46. As illustrated in FIG. 4B, WLAN (5 GHz band) is split into a plurality of frequency bands. For example, WLAN includes a WLAN1 band (5.15 GHz to 5.35 GHz) and a WLAN2 band (5.47 GHz to 5.85 GHz). 4G-LTE B46 is also split into a plurality of frequency bands. For example, B46 includes B46a and B46b frequency bands (5.15 GHz to 5.35 GHz) and B46c and B46d frequency bands (5.47 GHz to 5.925 GHz).

Transfer circuit 20B is one example of the first transfer circuit that transfers a signal of the first frequency band including at least a part of a frequency region under 5 GHz. The first frequency band includes one or more communication bands belonging to the 4G-LTE or 5G-NR ultra-high band group.

Transfer circuit 20B includes filter 21, switch 22, and transmission power amplifier 24.

Switch 22 includes common terminal 22a and selection terminals 22b and 22c. Common terminal 22a is connected to filter 21, selection terminal 22b is connected to transmission path 20T, and selection terminal 22c is connected to reception path 20R. With this connection configuration, switch 22 switches the connection of filter 21 between transmission path 20T and reception path 20R.

Transmission power amplifier 24 is one example of the first transmission power amplifier that amplifies a transmission signal of the first frequency band, and is disposed between transmission input terminal 121 and switch 22.

Transfer circuit 30B is one example of the second transfer circuit that transfers a signal of the second frequency band including at least a part of a frequency region higher than or equal to 5 GHz. The second frequency band includes at least one communication band from among 4G-LTE LAA, 5G-NR NR-U, and WLAN. In the present variation, the second frequency band is, for example, 4G-LTE B46 (5.15 GHz to 5.925 GHz). The second frequency band, i.e., B46, includes B46a and B46b (collectively the fourth frequency band) and B46c and B46d (collectively the fifth frequency band), as illustrated in FIG. 4B.

When transfer circuit 30B transfers a signal of the second frequency band that includes at least a frequency region of WLAN, the second frequency band includes WLAN1 (5.15 GHz to 5.35 GHz; the fourth frequency band) and WLAN2 (5.47 GHz to 5.85 GHz; the fifth frequency band).

Transfer circuit 30B includes filters 31a and 31c, band-stop filter 33a, switches 32, 35, and 36, and transmission power amplifier 34.

Band-stop filter 33a has at least a part of the first frequency band as an attenuation band, is disposed on transmission path 31T that connects switches 35 and 36, and is disposed between filter 31a and switch 35.

Filter 31a is one example of a fourth filter having the fourth frequency band as a passband. Filter 31a is disposed between band-stop filter 33a and switch 36, on transmission path 31T. Filter 31c is one example of a fifth filter having the fifth frequency band as a passband. Filter 31c is disposed between switch 35 and switch 36, on transmission path 32T that connects switch 35 and switch 36. Filter 31a preferably has the fifth frequency band as an attenuation band, and filter 31c preferably has the fourth frequency band as an attenuation band.

Switch 32 includes common terminal 32a and selection terminals 32b and 32c. Common terminal 32a is connected to selection terminal 10c of switch 10, selection terminal 32b is connected to transmission path 30T, and selection terminal 32c is connected to reception path 30R. With this connection configuration, switch 32 switches the connection of switch 10 between transmission path 30T and reception path 30R.

Switch 36 is one example of a third switch, and is disposed between the output terminal of transmission power amplifier 34 and filters 31a and 31c. Switch 36 includes common terminal 36a and selection terminals 36b and 36c. Common terminal 36a is connected to the output terminal of transmission power amplifier 34, selection terminal 36b is connected to transmission path 31T, and selection terminal 36c is connected to transmission path 32T. With this connection configuration, switch 36 switches the connection of transmission power amplifier 34 between filter 31a and filter 31c.

Switch 35 is one example of a fourth switch, and is disposed between selection terminal 32b and each of band-stop filter 33a and filter 31c. Switch 35 includes common terminal 35a and selection terminals 35b and 35c. Common terminal 35a is connected to selection terminal 32b, selection terminal 35b is connected to transmission path 31T, and selection terminal 35c is connected to transmission path 32T. With this connection configuration, switch 35 switches connection of selection terminal 32b between band-stop filter 33a and filter 31c. Selection terminal 32b also functions as a transmission output terminal connected to transmission path 30T.

Transmission power amplifier 34 is one example of the second transmission power amplifier that amplifies transmission signals of the second frequency band, and is disposed between transmission input terminal 131 and switch 36.

With radio frequency circuit 1B according to the present variation, in order to inhibit the degradation of reception sensitivity caused by third order intermodulation distortion of the first transmission signal and the second transmission signal, band-stop filter 33a is disposed on transmission path 31T that transmits a fourth transmission signal of the fourth frequency band of transfer circuit 30B. However, a band-stop filter is not disposed on transmission path 32T that transmits a fifth signal of the fifth frequency band of transfer circuit 30B.

Radio frequency circuit 1B according to the present variation is applied in cases in which the frequency of the third order intermodulation distortion of the first transmission signal of the first frequency band and the fourth transmission signal of the fourth frequency band is included in the third frequency band but the frequency of the third order intermodulation distortion of the first transmission signal of the first frequency band and the fifth transmission signal of the fifth frequency band is not included in the third frequency band.

With this configuration, when common terminal 35a and selection terminal 35b of switch 35 are connected and common terminal 36a and selection terminal 36b of switch 36 are connected, even if a first transmission signal of the first frequency band that is output from transfer circuit 20B toward antenna 2 is introduced into transfer circuit 30B via switch 10, the introduced first transmission signal is attenuated by band-stop filter 33a. This makes it possible to inhibit the generation of third order intermodulation distortion at transmission power amplifier 34 and filter 31a. Accordingly, when the first transmission signal, the fourth transmission signal, and the third reception signal are transferred simultaneously, the degradation of the reception sensitivity of transfer circuit 40 caused by third order intermodulation distortion defined by the first transmission signal and the fourth transmission signal can be inhibited.

On the other hand, when common terminal 35a and selection terminal 35c of switch 35 are connected and common terminal 36a and selection terminal 36c of switch 36 are connected, even if a first transmission signal of the first frequency band that is output from transfer circuit 20B toward antenna 2 is introduced into transfer circuit 30B via switch 10, the frequency of the third order intermodulation distortion defined by the introduced first transmission signal and the fifth transmission signal is not included in the third frequency band. In such cases, the fifth transmission signal transfers through transmission path 32T that does not pass through band-stop filter 33a. Accordingly, it is possible to transfer the fifth transmission signal with little loss when the first transmission signal, the fifth transmission signal, and the third reception signal are transferred simultaneously.

With radio frequency circuit 1B according to the present variation, providing band-stop filter 33a makes it possible to inhibit the sidelobe of a modulated signal of the fourth frequency band (for example, WLAN1 (5.15 GHz to 5.35 GHz)) that transfers through transfer circuit 30B from expanding into the first frequency band (a frequency range under 5 GHz).

6. Circuit Configuration of Radio Frequency Circuit 1C According to Variation 3

Figure 5:
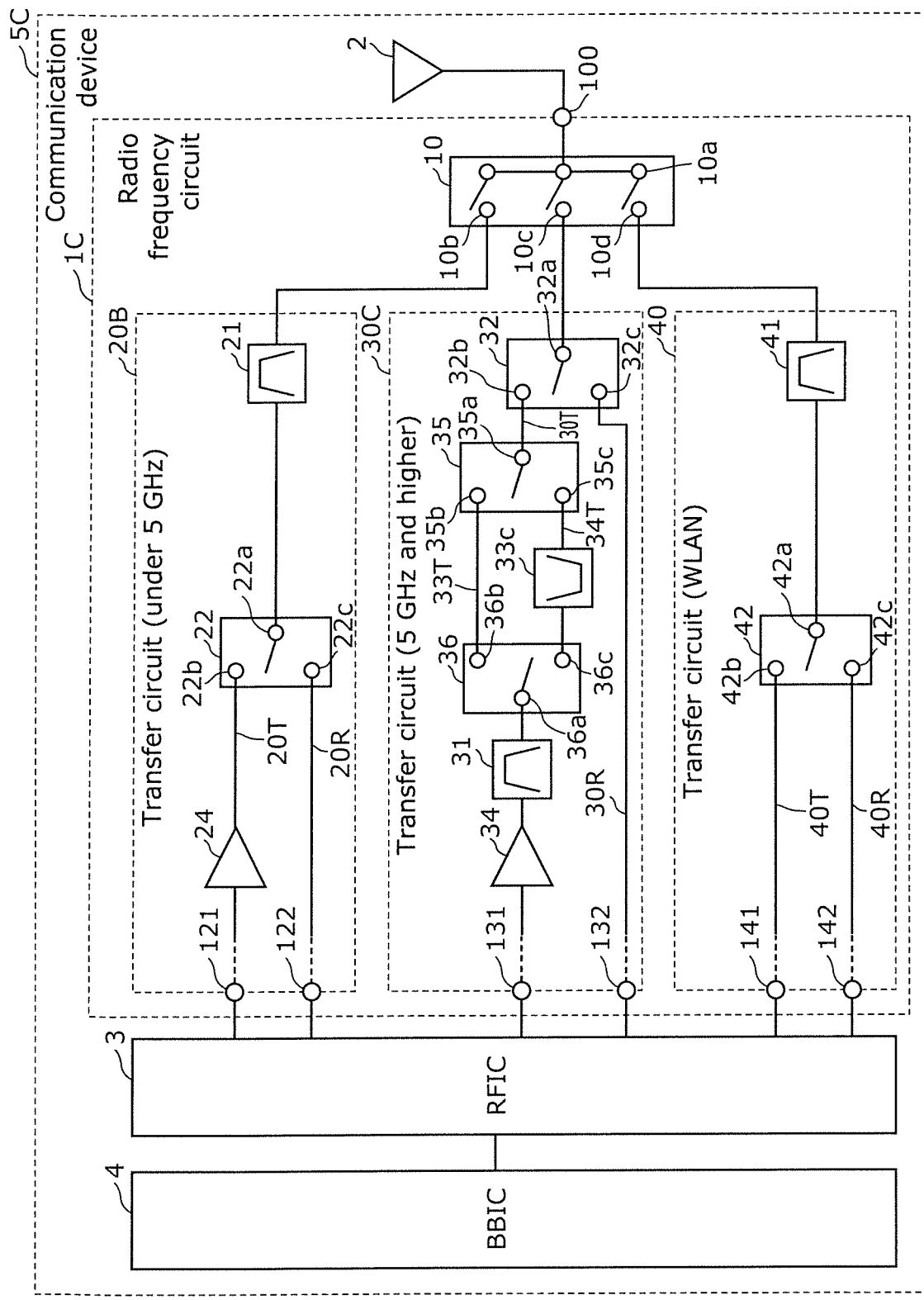
FIG. 5 illustrates a circuit configuration of a radio frequency circuit and a communication device according to Variation 3 of the embodiment.

FIG. 5 illustrates a circuit configuration of radio frequency circuit 1C and communication device 5C according to Variation 3 of the embodiment. As illustrated in FIG. 5, communication device 5C includes radio frequency circuit 1C, antenna 2, RFIC 3, and BBIC 4. Communication device 5C according to the present variation differs from communication device 5 according to the embodiment in regard to the configuration of radio frequency circuit 1C only. Hereinafter, radio frequency circuit 1C according to the present variation will be described.

Radio frequency circuit 1C includes antenna connection terminal 100, switch 10, and transfer circuits 20B, 30C, and

40. Radio frequency circuit 1C according to the present variation differs from radio frequency circuit 1B according to Variation 2 in regard to the configuration of transfer circuit 30C only. Hereinafter, the descriptions of common points between radio frequency circuit 1C according to the present variation and radio frequency circuit 1B according to Variation 2 will be omitted; the description will focus on the points of differences in configuration.

Transfer circuit 30C is one example of the second transfer circuit that transfers a signal of the second frequency band including at least a part of a frequency region higher than or equal to 5 GHz. The second frequency band includes at least one communication band from among 4G-LTE LAA, 5G-NR NR-U, and WLAN. In the present variation, the second frequency band is, for example, 4G-LTE B46 (5.15 GHz to 5.925 GHz).

Transfer circuit 30C includes filter 31, switches 32, 35, and 36, band-stop filter 33c, and transmission power amplifier 34.

Band-stop filter 33c is disposed on the output side of transmission power amplifier 34, and has at least a part of the first frequency band as an attenuation band. More specifically, band-stop filter 33c is disposed on transmission path 34T that connects switches 35 and 36.

Filter 31 is one example of the second filter having the second frequency band as a passband. Filter 31 is disposed between switch 36 and the output terminal of transmission power amplifier 34.

Switch 32 includes common terminal 32a and selection terminals 32b and 32c. Common terminal 32a is connected to selection terminal 10c of switch 10, selection terminal 32b is connected to transmission path 30T that connects transmission input terminal 131 and selection terminal 32b, and selection terminal 32c is connected to reception path 30R that connects reception output terminal 132 and selection terminal 32c. With this connection configuration, switch 32 switches the connection of switch 10 between transmission path 30T and reception path 30R.

Switch 36 is one example of the first switch, and is disposed between the output terminal of transmission power amplifier 34 and each of band-stop filter 33c and bypass path 33T. Switch 36 includes common terminal 36a and selection terminals 36b and 36c. Common terminal 36a is connected to filter 31, selection terminal 36b is connected to bypass path 33T, and selection terminal 36c is connected to transmission path 34T. Note that bypass path 33T is a path on which no band-stop filter or band-pass filter is disposed. With this connection configuration, switch 36 switches the connection of transmission power amplifier 34 between band-stop filter 33c and bypass path 33T.

Switch 35 is one example of the second switch, and is disposed between selection terminal 32b and each of band-stop filter 33c and bypass path 33T. Switch 35 includes common terminal 35a and selection terminals 35b and 35c. Common terminal 35a is connected to selection terminal 32b, selection terminal 35b is connected to bypass path 33T, and selection terminal 35c is connected to transmission path 34T. With this connection configuration, switch 35 switches the connection of selection terminal 32b between band-stop filter 33c and bypass path 33T. Selection terminal 32b also functions as a transmission output terminal connected to transmission path 30T.

Transmission power amplifier 34 is one example of the second transmission power amplifier that amplifies a transmission signal of the second frequency band, and is disposed between transmission input terminal 131 and filter 31.

With radio frequency circuit 1C according to the present variation, in order to inhibit the degradation of reception sensitivity caused by third order intermodulation distortion of the first transmission signal and the second transmission signal, band-stop filter 33c is disposed on transmission path 34T of transfer circuit 30C. On the other hand, no band-stop filter is disposed on bypass path 33T of transfer circuit 30C.

With this configuration, when the frequency of the above-described third order intermodulation distortion is included in the third frequency band, common terminal 35a and selection terminal 35c of switch 35 are connected and common terminal 36a and selection terminal 36c of switch 36 are connected. In such cases, since the first transmission signal is attenuated by band-stop filter 33c, it possible to inhibit the generation of third order intermodulation distortion at transmission power amplifier 34 and filter 31. Accordingly, when the first transmission signal, the second transmission signal, and the third reception signal are transferred simultaneously, the degradation of the reception sensitivity of transfer circuit 40 caused by third order intermodulation distortion defined by the first transmission signal and the second transmission signal can be inhibited.

However, when the frequency of the intermodulation distortion between the first transmission signal and the second transmission signal is not included in the third frequency band, common terminal 35a and selection terminal 35b of switch 35 are connected and common terminal 36a and selection terminal 36b of switch 36 are connected. In such cases, since the second transmission signal passes through bypass path 33T, it possible to transfer the second transmission signal with little loss.

Radio frequency circuit 1 according to the embodiment includes: transfer circuit 20 configured to transfer a signal of a first frequency band including at least a part of a frequency region under 5 GHz; transfer circuit 30 configured to transfer a signal of a second frequency band including at least a part of a frequency region higher than or equal to 5 GHz; and transfer circuit 40 configured to transfer a signal of a third frequency band including at least a part of a frequency region higher than or equal to 5 GHz. One of transfer circuit 30 and transfer circuit 40 is configured to transfer a WLAN signal. Transfer circuit 20 includes filter 21 having the first frequency band as a passband. Transfer circuit 30 includes filter 31 having the second frequency band as a passband. Transfer circuit 40 includes filter 41 having the third frequency band as a passband. One of transfer circuit 20 and transfer circuit 30 further includes band-stop filter 23 having, as an attenuation band, at least a part of a frequency band in which a remaining one of transfer circuit 20 or transfer circuit 30 transfers a signal.

With this configuration, band-stop filter 23 is disposed in transfer circuit 20 in order to inhibit the degradation in reception sensitivity of the third reception signal of the third frequency band caused by IMD3 between the first transmission signal of the first frequency band and the second transmission signal of the second frequency band, and inhibit a reduction in quality of transmission signals. Accordingly, even if the second transmission signal that is output from transfer circuit 30 is introduced into transfer circuit 20, the introduced second transmission signal is attenuated by band-stop filter 23. This inhibits the above-described IMD3 in transfer circuit 20. Accordingly, when the third reception signal in transfer circuit 40 is transferred at the same time as the first transmission signal and the second transmission signal, it is possible to inhibit the degradation of the reception sensitivity of transfer circuit 40 caused by the above-described IMD3. It is also possible to inhibit a reduction in signal quality of the first transmission signal and the second transmission signal caused by the above-described IMD3. Stated differently, it is possible to provide radio frequency circuit 1 in which intermodulation distortion generation is inhibited when a signal of a WLAN communication band, a signal of a communication band in an unlicensed band higher than or equal to 5 GHz, and a signal of a communication band under 5 GHz are simultaneously used.

As in radio frequency circuit 1C according to Variation 3, transfer circuit 30C may include band-stop filter 33c. Transfer circuit 30C may further include transmission power amplifier 34 configured to amplify a second transmission signal of the second frequency band. Band-stop filter 33c may be disposed on an output side of transmission power amplifier 34, and may have at least a part of the first frequency band as an attenuation band. Transfer circuit 30C may further include: switch 36 disposed between transmission power amplifier 34 and band-stop filter 33c, and configured to switch the connection of transmission power amplifier 34 between band-stop filter 33c and bypass path 33T on which the band-stop filter is not disposed; and switch 35 disposed between selection terminal 32b and band-stop filter 33c, and configured to switch the connection of selection terminal 32b between band-stop filter 33c and bypass path 33T.

With this configuration, when the frequency of the above-described IMD3 is included in the third frequency band, common terminal 35a and selection terminal 35c of switch 35 are connected and common terminal 36a and selection terminal 36c of switch 36 are connected. In such cases, since the first transmission signal is attenuated by band-stop filter 33c, it possible to inhibit the generation of IMD3 at transmission power amplifier 34 and filter 31. Accordingly, when the first transmission signal, the second transmission signal, and the third reception signal are transferred simultaneously, the degradation of the reception sensitivity of transfer circuit 40 caused by the above-described IMD3 can be inhibited. However, when the frequency of the above-described IMD3 is not included in the third frequency band, common terminal 35a and selection terminal 35b of switch 35 are connected and common terminal 36a and selection terminal 36b of switch 36 are connected. In such cases, since the second transmission signal passes through bypass path 33T, it possible to transfer the second transmission signal with little loss.

Radio frequency circuit 1A according to Variation 1 includes: transfer circuit 20A configured to transfer a signal of a first frequency band including at least a part of a frequency region under 5 GHz; transfer circuit 30A configured to transfer a signal of a second frequency band including at least a part of a frequency region higher than or equal to 5 GHz; and transfer circuit 40 configured to transfer a signal of a third frequency band including at least a part of a frequency region higher than or equal to 5 GHz. One of transfer circuit 30A and transfer circuit 40 is configured to transfer a WLAN signal. Transfer circuit 20A includes transmission power amplifier 24 configured to amplify transmission signals of the first frequency band. Transfer circuit 30A includes transmission power amplifier 34 configured to amplify transmission signals of the second frequency band. One of transfer circuit 20A and transfer circuit 30A further includes band-stop filter 23 having, as an attenuation band, at a least part of a frequency band in which a remaining one of transfer circuit 20A or transfer circuit 30A transfers signals.

With this configuration, band-stop filter 23 is disposed in transfer circuit 20A in order to inhibit the degradation in reception sensitivity of the third reception signal of the third frequency band caused by IMD3 between the first transmission signal of the first frequency band and the second transmission signal of the second frequency band, and inhibit a reduction in quality of transmission signals. Accordingly, even if the second transmission signal that is output from transfer circuit 30A is introduced into transfer circuit 20A, the introduced second transmission signal is attenuated by band-stop filter 23. This makes it possible to inhibit the above-described IMD3 that generates in transmission power amplifier 24. Accordingly, when the third reception signal in transfer circuit 40 is transferred at the same time as the first transmission signal and the second transmission signal, it is possible to inhibit the degradation of the reception sensitivity of transfer circuit 40 caused by the above-described IMD3. It is also possible to inhibit a reduction in signal quality of the first transmission signal and the second transmission signal caused by the above-described IMD3. Stated differently, it is possible to provide radio frequency circuit 1A in which intermodulation distortion generation is inhibited when a signal of a WLAN communication band, a signal of a communication band in an unlicensed band higher than or equal to 5 GHz, and a signal of a communication band under 5 GHz are simultaneously used.

As in radio frequency circuit 1B according to Variation 2, transfer circuit 30B may include band-stop filter 33a. The second frequency band may include a fourth frequency band and a fifth frequency band that do not overlap. Band-stop filter 33a may have the first frequency band as an attenuation band. Transfer circuit 30B may further include: filter 31a that is connected to band-stop filter 33a and has the fourth frequency band as a passband; filter 31c that has the fifth frequency band as a passband; switch 36 that is disposed between an output terminal of transmission power amplifier 34 and each of filter 31a and filter 31c, and is configured to switch the connection of the output terminal between filter 31a and filter 31c; and switch 35 disposed between selection terminal 32b and each of band-stop filter 33a and filter 31c, and configured to switch the connection of selection terminal 32b between band-stop filter 33a and filter 31c.

With this configuration, when common terminal 35a and selection terminal 35b of switch 35 are connected and common terminal 36a and selection terminal 36b of switch 36 are connected, even if a first transmission signal output from transfer circuit 20B is introduced into transfer circuit 30B, the introduced first transmission signal is attenuated by band-stop filter 33a. This makes it possible to inhibit the generation of IMD3 at transmission power amplifier 34 and filter 31a. Accordingly, when the first transmission signal, the fourth transmission signal of the fourth frequency band, and the third reception signal are transferred simultaneously, the degradation of the reception sensitivity of transfer circuit 40 caused by IMD3 defined by the first transmission signal and the fourth transmission signal can be inhibited. On the other hand, when common terminal 35a and selection terminal 35c of switch 35 are connected and common terminal 36a and selection terminal 36c of switch 36 are connected, even if a first transmission signal output from transfer circuit 20B is introduced into transfer circuit 30B, the frequency of IMD3 defined by the introduced first transmission signal and the fifth transmission signal of the fifth frequency band is not included in the third frequency band. In such cases, the fifth transmission signal transfers through transmission path 32T that does not pass through band-stop filter 33a. Accordingly, it is possible to transfer the fifth transmission signal with little loss when the first transmission signal, the fifth transmission signal, and the third reception signal are transferred simultaneously.

Radio frequency circuit 1 may further include: antenna connection terminal 100; and switch 10 disposed between antenna connection terminal 100 and each of transfer circuits 20 through 40, and configured to connect and disconnect antenna connection terminal 100 and transfer circuit 20, connect and disconnect antenna connection terminal 100 and transfer circuit 30, and connect and disconnect antenna connection terminal 100 and transfer circuit 40.

This configuration makes it possible to simultaneously transfer at least two signals from among a signal of the first frequency band, a signal of the second frequency band, and a signal of the third frequency band. Furthermore, by disposing switch 10 as illustrated in FIG. 1, when at least any one of transfer circuits 20, 30, and 40 is not used, by placing the selection terminal connected to the unused transfer circuit and common terminal 10a in a non-conducting state, isolation between transfer circuits can be improved.

Radio frequency circuit 1 may further include antenna connection terminal 100. Each of filter 21, filter 31, and filter 41 may be directly connected to antenna connection terminal 100.

This configuration makes it possible to compensate for the increase in transfer loss by band-stop filter 23 by removing switch 10.

A frequency of a third order intermodulation distortion between a signal of the first frequency band and a signal of one of the second frequency band and the third frequency band is included in a remaining one of the second frequency band and the third frequency band.

The first frequency band may be a frequency band ranging from 4.4 GHz to 5.0 GHz that is used in 4G-LTE or 5G-NR, one of the second frequency band and the third frequency band may be a frequency band ranging from 5.15 GHz to 5.925 GHz that is used in 4G-LTE or 5G-NR, and a remaining one of the second frequency band and the third frequency band may be a frequency band ranging from 5.15 GHz to 5.85 GHz that is used in WLAN.

The first frequency band may be any one of: a frequency band ranging from 3.3 GHz to 4.2 GHz that is used in 4G-LTE or 5G-NR; a frequency band ranging from 3.4 GHz to 3.6 GHz that is used in 4G-LTE or 5G-NR, a frequency band ranging from 3.6 GHz to 3.8 GHz that is used in 4G-LTE or 5G-NR, a frequency band ranging from 3.55 GHz to 3.7 GHz that is used in 4G-LTE or 5G-NR; and a frequency band ranging from 3.3 GHz to 3.8 GHz that is used in 4G-LTE or 5G-NR. One of the second frequency band and the third frequency band may be a frequency band ranging from 5.15 GHz to 5.85 GHz that is used in 4G-LTE or 5G-NR, and a remaining one of the second frequency band or the third frequency band is a frequency band ranging from 6.10 GHz to 7.125 GHz that is used in WLAN.

Communication device 5 according to the embodiment includes: antenna 2; RFIC 3 configured to process radio frequency signals transmitted and received by antenna 2; and radio frequency circuit 1 configured to transfer the radio frequency signals between antenna 2 and RFIC 3.

This configuration makes it possible to provide communication device 5 in which intermodulation distortion generation can be inhibited when a signal of a WLAN communication band, a signal of a communication band in an unlicensed band of higher than or equal to 5 GHz, and a signal of a communication band under 5 GHz are simultaneously used.

OTHER EMBODIMENTS

Although the radio frequency circuit and the communication device according to the present disclosure have been described above by way of embodiments and variations, the present disclosure is not limited to the above embodiments and variations. The present disclosure also includes other embodiments realized by combining any elements in the above embodiments and variations, variations obtained by making various modifications to the above embodiments and variations that can be conceived by a person of ordinary skill in the art without departing from the scope of the present disclosure, and various devices that include the radio frequency circuit and the communication device according to the present disclosure.

For example, a matching element such as an inductor or a capacitor, or a switch circuit may be connected between circuit elements in the radio frequency circuit and the communication device according to the above embodiments and variations. Note that an inductor may include a line inductor implemented as a line that joins circuit elements.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be widely used in communication devices such as a mobile phone, as a radio frequency circuit and communication device that are applicable to a multi-band system including a WLAN band and an unlicensed band that are higher than or equal to 5 GHz.

The invention claimed is:

1. A radio frequency circuit, comprising:
a first transfer circuit configured to transfer a signal of a first frequency band, the first frequency band including at least a part of a frequency region under 5 GHz;
a second transfer circuit configured to transfer a signal of a second frequency band, the second frequency band including at least a part of a frequency region higher than or equal to 5 GHz; and
a third transfer circuit configured to transfer a signal of a third frequency band, the third frequency band including at least a part of a frequency region higher than or equal to 5 GHz,
wherein one of the second transfer circuit or the third transfer circuit is configured to transfer a wireless local area network (WLAN) signal,
the first transfer circuit includes a first filter having the first frequency band as a passband,
the second transfer circuit includes a second filter having the second frequency band as a passband,
the third transfer circuit includes a third filter having the third frequency band as a passband,
one of the first transfer circuit or the second transfer circuit further includes a band-stop filter having, as an attenuation band, at least a part of a frequency band in which a remaining one of the first transfer circuit or the second transfer circuit transfers a signal,
the first frequency band is a frequency band ranging from 4.4 GHz to 5.0 GHz that is used in 4th generation mobile communication system Long Term Evolution (4G-LTE) or 5th generation mobile communication system New Radio (5G-NR),
one of the second frequency band and the third frequency band is a frequency band ranging from 5.15 GHz to 5.925 GHz that is used in 4G-LTE or 5G-NR, and
a remaining one of the second frequency band or the third frequency band is a frequency band ranging from 5.15 GHz to 5.85 GHz that is used in WLAN.

2. The radio frequency circuit of claim 1,
wherein the second transfer circuit includes the band-stop filter,
the second transfer circuit further includes:
  a transmission output terminal; and
  a second transmission power amplifier configured to amplify a transmission signal of the second frequency band,
the band-stop filter is disposed on an output side of the second transmission power amplifier, and has at least a part of the first frequency band as an attenuation band, and
the second transfer circuit further includes:
  a first switch disposed between the second transmission power amplifier and the band-stop filter, and configured to switch connection of the second transmission power amplifier between the band-stop filter and a bypass path on which the band-stop filter is not disposed; and
  a second switch disposed between the transmission output terminal and the band-stop filter, and configured to switch connection of the transmission output terminal between the band-stop filter and the bypass path.

3. The radio frequency circuit of claim 1, further comprising:
an antenna connection terminal; and
a fifth switch disposed between the antenna connection terminal and each of the first transfer circuit, the second transfer circuit, and the third transfer circuit, and configured to connect and disconnect the antenna connection terminal and the first transfer circuit, to connect and disconnect the antenna connection terminal and the second transfer circuit, and to connect and disconnect the antenna connection terminal and the third transfer circuit.

4. The radio frequency circuit of claim 1, further comprising:
an antenna connection terminal,
wherein each of the first filter, the second filter, and the third filter is directly connected to the antenna connection terminal.

5. The radio frequency circuit of claim 1,
wherein a frequency of a third order intermodulation distortion between a signal of the first frequency band and a signal of one of the second frequency band and the third frequency band is included in a remaining one of the second frequency band or the third frequency band.

6. A communication device, comprising:
an antenna;
a radio frequency (RF) signal processing circuit configured to process radio frequency signals transmitted and received by the antenna; and
the radio frequency circuit of claim 1 configured to transfer the radio frequency signals between the antenna and the RF signal processing circuit.

7. A radio frequency circuit, comprising:
a first transfer circuit configured to transfer a signal of a first frequency band, the first frequency band including at least a part of a frequency region under 5 GHz;
a second transfer circuit configured to transfer a signal of a second frequency band, the second frequency band including at least a part of a frequency region higher than or equal to 5 GHz; and
a third transfer circuit configured to transfer a signal of a third frequency band, the third frequency band including at least a part of a frequency region higher than or equal to 5 GHz,
wherein one of the second transfer circuit and the third transfer circuit is configured to transfer a wireless local area network (WLAN) signal,
the first transfer circuit includes a first transmission power amplifier configured to amplify a transmission signal of the first frequency band,
the second transfer circuit includes a second transmission power amplifier configured to amplify a transmission signal of the second frequency band,
one of the first transfer circuit and the second transfer circuit further includes a band-stop filter having, as an attenuation band, at least a part of a frequency band in which a remaining one of the first transfer circuit or the second transfer circuit transfers a signal,
the first frequency band is a frequency band ranging from 4.4 GHz to 5.0 GHz that is used in 4th generation mobile communication system Long Term Evolution (4G-LTE) or 5th generation mobile communication system New Radio (5G-NR),
one of the second frequency band and the third frequency band is a frequency band ranging from 5.15 GHz to 5.925 GHz that is used in 4G-LTE or 5G-NR, and
a remaining one of the second frequency band or the third frequency band is a frequency band ranging from 5.15 GHz to 5.85 GHz that is used in WLAN.

8. The radio frequency circuit of claim 7,
wherein the second transfer circuit includes the band-stop filter,
the second frequency band includes a fourth frequency band and a fifth frequency band that do not overlap each other,
the band-stop filter has the first frequency band as an attenuation band, and
the second transfer circuit further includes:
  a transmission output terminal;
  a fourth filter that is connected to the band-stop filter and has the fourth frequency band as a passband;
  a fifth filter that has the fifth frequency band as a passband;
  a third switch that is disposed between an output terminal of the second transmission power amplifier and each of the fourth filter and the fifth filter, and is configured to switch connection of the output terminal between the fourth filter and the fifth filter; and
  a fourth switch disposed between the transmission output terminal and each of the band-stop filter and the fifth filter, and configured to switch connection of the transmission output terminal between the band-stop filter and the fifth filter.

9. The radio frequency circuit of claim 7, further comprising:
an antenna connection terminal; and
a fifth switch disposed between the antenna connection terminal and each of the first transfer circuit, the second transfer circuit, and the third transfer circuit, and configured to connect and disconnect the antenna connection terminal and the first transfer circuit, to connect and disconnect the antenna connection terminal and the second transfer circuit, and to connect and disconnect the antenna connection terminal and the third transfer circuit.

10. The radio frequency circuit of claim 7,
wherein a frequency of a third order intermodulation distortion between a signal of the first frequency band and a signal of one of the second frequency band and the third frequency band is included in a remaining one of the second frequency band or the third frequency band.

11. A communication device, comprising:
an antenna;
a radio frequency (RF) signal processing circuit configured to process radio frequency signals transmitted and received by the antenna; and
the radio frequency circuit of claim 3 configured to transfer the radio frequency signals between the antenna and the RF signal processing circuit.

12. A radio frequency circuit, comprising:
a first transfer circuit configured to transfer a signal of a first frequency band, the first frequency band including at least a part of a frequency region under 5 GHz;
a second transfer circuit configured to transfer a signal of a second frequency band, the second frequency band including at least a part of a frequency region higher than or equal to 5 GHz; and
a third transfer circuit configured to transfer a signal of a third frequency band, the third frequency band including at least a part of a frequency region higher than or equal to 5 GHz,
wherein one of the second transfer circuit or the third transfer circuit is configured to transfer a wireless local area network (WLAN) signal,
the first transfer circuit includes a first filter having the first frequency band as a passband,
the second transfer circuit includes a second filter having the second frequency band as a passband,
the third transfer circuit includes a third filter having the third frequency band as a passband,
one of the first transfer circuit or the second transfer circuit further includes a band-stop filter having, as an attenuation band, at least a part of a frequency band in which a remaining one of the first transfer circuit or the second transfer circuit transfers a signal,
the first frequency band is any one of: a frequency band ranging from 3.3 GHz to 4.2 GHz that is used in 4th generation mobile communication system Long Term Evolution (4G-LTE) or 5th generation mobile communication system New Radio (5G-NR); a frequency band ranging from 3.4 GHz to 3.6 GHz that is used in 4G-LTE or 5G-NR, a frequency band ranging from 3.6 GHz to 3.8 GHz that is used in 4G-LTE or 5G-NR, a frequency band ranging from 3.55 GHz to 3.7 GHz that is used in 4G-LTE or 5G-NR; and a frequency band ranging from 3.3 GHz to 3.8 GHz that is used in 4G-LTE or 5G-NR,
one of the second frequency band or the third frequency band is a frequency band ranging from 5.15 GHz to 5.85 GHz that is used in 4G-LTE or 5G-NR, and
a remaining one of the second frequency band or the third frequency band is a frequency band ranging from 6.10 GHz to 7.125 GHz that is used in WLAN.

13. A radio frequency circuit, comprising:
a first transfer circuit configured to transfer a signal of a first frequency band, the first frequency band including at least a part of a frequency region under 5 GHz;
a second transfer circuit configured to transfer a signal of a second frequency band, the second frequency band including at least a part of a frequency region higher than or equal to 5 GHz; and
a third transfer circuit configured to transfer a signal of a third frequency band, the third frequency band including at least a part of a frequency region higher than or equal to 5 GHz,
wherein one of the second transfer circuit and the third transfer circuit is configured to transfer a wireless local area network (WLAN) signal,
the first transfer circuit includes a first transmission power amplifier configured to amplify a transmission signal of the first frequency band,
the second transfer circuit includes a second transmission power amplifier configured to amplify a transmission signal of the second frequency band,
one of the first transfer circuit and the second transfer circuit further includes a band-stop filter having, as an attenuation band, at least a part of a frequency band in which a remaining one of the first transfer circuit or the second transfer circuit transfers a signal,
the first frequency band is any one of: a frequency band ranging from 3.3 GHz to 4.2 GHz that is used in 4th generation mobile communication system Long Term Evolution (4G-LTE) or 5th generation mobile communication system New Radio (5G-NR); a frequency band ranging from 3.4 GHz to 3.6 GHz that is used in 4G-LTE or 5G-NR, a frequency band ranging from 3.6 GHz to 3.8 GHz that is used in 4G-LTE or 5G-NR, a frequency band ranging from 3.55 GHz to 3.7 GHz that is used in 4G-LTE or 5G-NR; and a frequency band ranging from 3.3 GHz to 3.8 GHz that is used in 4G-LTE or 5G-NR,
one of the second frequency band and the third frequency band is a frequency band ranging from 5.15 GHz to 5.85 GHz that is used in 4G-LTE or 5G-NR, and
a remaining one of the second frequency band or the third frequency band is a frequency band ranging from 6.10 GHz to 7.125 GHz that is used in WLAN.

* * * * *